Feb. 9, 1937. F. H. BIGGS 2,070,390
BAG SEALING AND LABELING MACHINE
Filed April 1, 1935 10 Sheets-Sheet 5

Inventor
Franklin H. Biggs
Owen & Owen
Attorneys

Feb. 9, 1937. F. H. BIGGS 2,070,390
BAG SEALING AND LABELING MACHINE
Filed April 1, 1935 10 Sheets-Sheet 6

Patented Feb. 9, 1937

2,070,390

UNITED STATES PATENT OFFICE 2,070,390

BAG SEALING AND LABELING MACHINE

Franklin H. Biggs, Toledo, Ohio, assignor to The Woolson Spice Company, Toledo, Ohio, a corporation of Ohio Application April 1, 1935, Serial No. 14,046

15 Claims. (Cl. 216—55)

This invention relates to packaging machinery, and is more particularly directed to a machine to seal and label bags made from a thermoplastic material.

The primary object of the present invention is the provision of an automatic machine to seal bags, position a label on the sealed portion, and subsequently seal the label in proper position.

Another object of the invention is the provision of improved feeding means for a machine of this character.

Another object of the invention is the provision of novel label handling means which is adapted to pick a label from a stack, square it to a predetermined position, crease it and deliver it to a sealed bag in timed relation to the movements of the machine.

Another object of the invention is the provision of novel and efficient means to center the labels on the bags and seal them in place solely by the application of heat and pressure.

Other objects and advantages of the invention will become apparent as the description proceeds, reference being had to the accompanying drawings which disclose a machine constructed in accordance with the present invention, and in which—

Figure 1 is a front elevation of a machine embodying the present invention, with parts broken away; Fig. 8 is a fragmentary sectional side view of the label feeding mechanism with parts diagrammatically shown in extended position.

In the embodiment of my invention as illustrated in the accompanying drawings, the bags are fed to the machine in pairs and intermittently moved to different positions in the machine for successive operations. The operation consists in placing a label on the sealed mouth of each bag, the label having been previously creased along the proper line, and subsequently centering the creased label on the bag and sealing it in place thereon by the application of heat and pressure.

The frame structure of the machine, in its present embodiment, comprises a pair of front standards A, A, and a pair of rear standards B, B, the former being more widely spaced than the latter; a base portion C connecting the standards at their lower ends, and a top structure D rigidly carried by and connecting the standards a distance above the base. The top structure D comprises a lower portion d, which connects the standards a distance above the base C, and an upper portion d', which connects the upper ends of the rear standards B and at its forward end rests on and is supported by the lower frame portion d, which connects the front standards A.

A motor 1 is mounted on the frame base C and drives a countershaft 2 through an intermediate connection 3, the countershaft being journaled in the top frame structure D. The countershaft 2 has controlled driving connection with a main shaft 4 through a belt and pulley connection 5, a manually operable clutch 6, a clutch shaft 7 and gears 8 and 9. The shaft 4 is mounted in the lower portion of the frame in bearing standards rising from the base C. Each of the mechanisms subsequently described is driven from the main drive shaft 4, except for a vacuum pump 10, which is driven by a belt 11 from the countershaft 2, so that it is not affected by engagement or disengagement of the clutch 5.

Figures 19, 26:
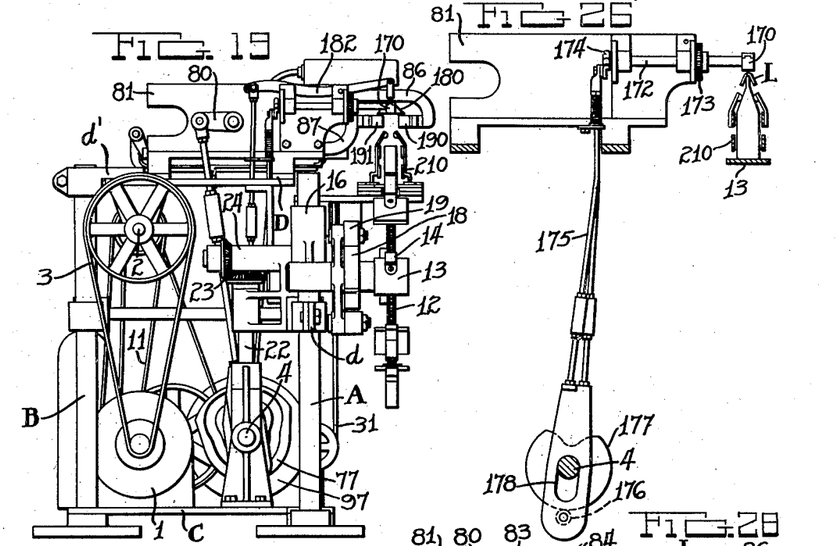
Fig. 19 is an end view of the full machine.
Fig. 26 is a detail view of the operating mechanism for one part of the label centering mechanism.

As best shown in Figs. 1 and 19, a conveyor chain 12, having bag-receiving platforms 13 and projections 14 extending therefrom, is trained over sprocket-wheels 15 at each end of the machine, the shafts for which project from sleeves 16 mounted on the upper ends of the standards A and connected by a cross-beam 17. The conveyor is intermittently moved by a ratchet-wheel 18 and pawl 19 mounted on the shaft 20 with the left-hand sprocket-wheel 15. The ratchet-wheel is fixed to the sprocket 15, while the pawl 19 is free to rotate on a shoulder carried by the ratchet-wheel 18. A miter gear set 21 is carried on the main drive shaft 4, and rotation of the latter causes rotation of a vertical shaft 22 journaled in suitable parts of the frame base C. Another miter gear set 23 (Fig. 19) is disposed at the top of the vertical shaft 22 and drives a horizontal shaft 24, journaled in a bearing standard carried by the lower portion d of the top frame D. A crank 25, carried by the horizontal shaft 24, moves the pawl 19 through a suitable connecting rod 26, so that the pawl has a rotary reciprocatory movement about the shaft 20. In the clockwise direction of its movement in Fig. 1, the pawl rides on the surface of the ratchet-wheel 18, while in its counterclockwise movement it engages the teeth of the ratchet and rotates the latter together with the sprocket 15, thus causing a measured progression of the conveyor belt 12.

Bag feeding mechanism

Figure 4:
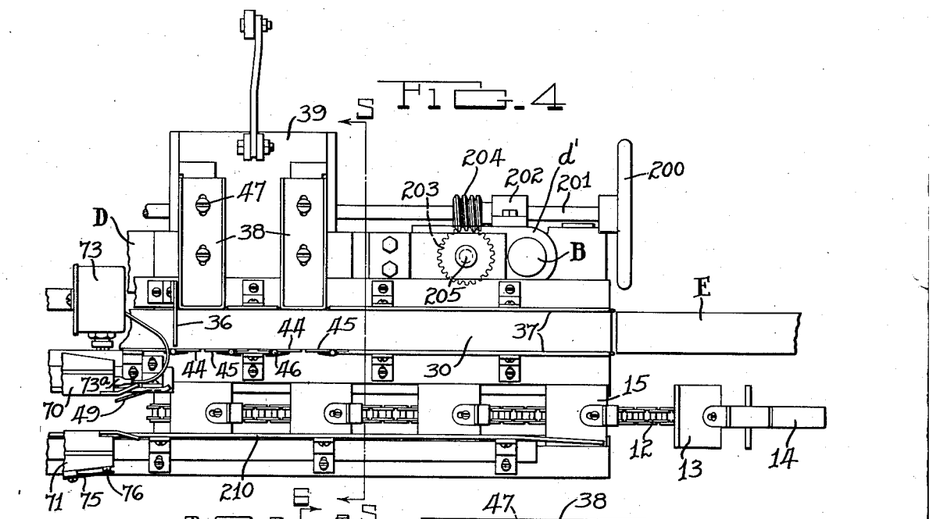
Fig. 4 is a fragmentary top plan view of the machine showing the bag feeding mechanism.

The bag feeding mechanism includes a continuously moving conveyor belt 30 driven from the main drive shaft 4 by a belt 31, which drives a shaft 32 having a fixed pulley 33 over which the conveyor belt 30 is trained. An idler pulley 34 is disposed at the extreme end of the machine, and, in use, closely abuts a similar pulley for a conveyor belt E of a weighing and packing machine. The filled bags are thus fed to the belt 30 ready to be sealed and to be transferred to the conveyor 12 which is parallel to and in a horizontal plane therewith. As shown in Fig. 4 of the drawings, a stop member 36 is placed across the conveyor belt 30 and is adapted to limit the movement of a bag as it is carried by the belt. The first bag fed to the machine will rest against this stop 36 and other bags will build up against it. Suitable side guides 37 are provided to keep the bags in line.

Figure 20:
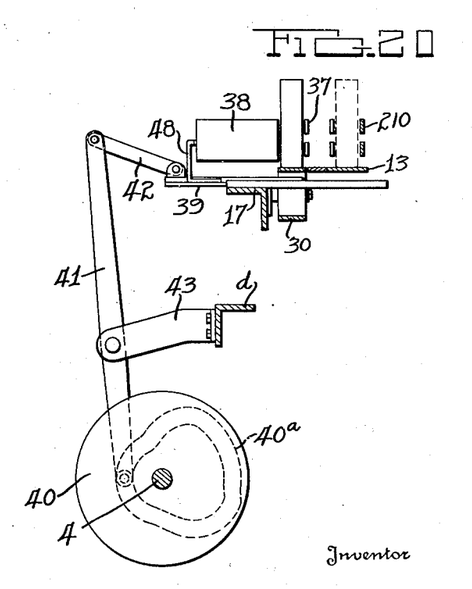
Fig. 20 is a somewhat diagrammatic detail view of the bag feeding actuating mechanism.

The function of the feeding mechanism is to transfer two bags at a time to the intermittently moved conveyor 12 whenever this latter member presents two bag-receiving platforms 13. To transfer the bags from the conveyor belt 30 to the conveyor 12, two similar pusher members 38 are provided which are actuated in timed relation to the movement of the conveyor 12 by the mechanism shown in Fig. 20. As there shown, the pushers are mounted on a slide 39 for reciprocating movements relative to the frame 1 and to the conveyor belt 30. A cam 40 carried by the main drive shaft 4 moves a pivoted lever 41 having one end engaged in the cam-track 40ª and the opposite end connected to a link 42, which latter is connected to the slide 39. The lever 41 is pivoted intermediate its ends to a suitable frame part or bracket 43.

Figures 5, 6:
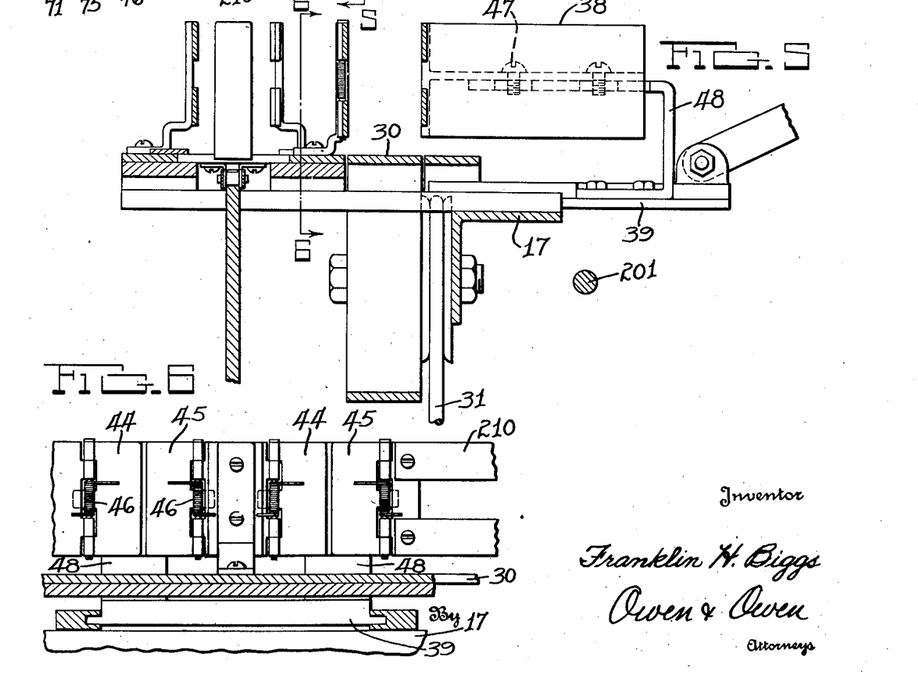
Fig. 5 is a section on line 5—5 of Fig. 4.
Fig. 6 is a detail view of the gate mechanism taken on line 6—6 of Fig. 5.
Figure 7:
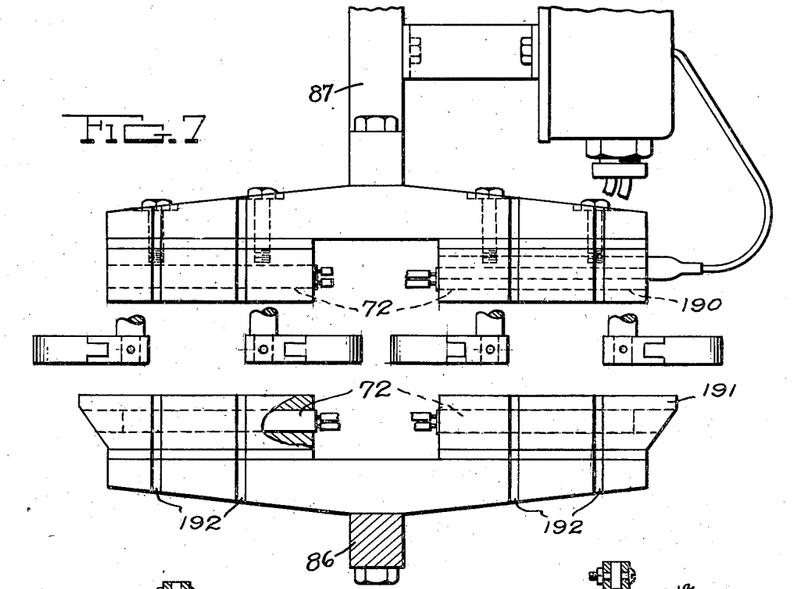
Fig. 7 is a fragmentary plan view of the label sealing jaws.
Figures 9, 13:
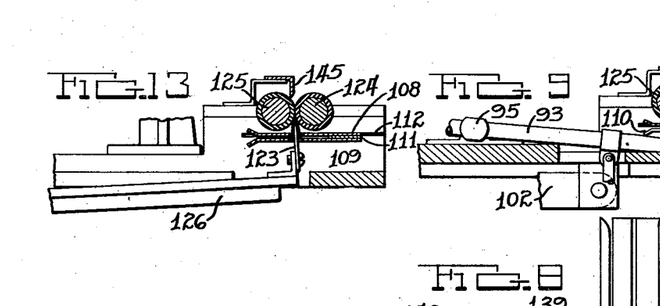
Fig. 9 is a detail view of a part of the label feeding mechanism.
Fig. 13 is a side view of the label creasing means.

Hinged gates 44 and 45 (Fig. 6) are provided in the side guides 37 and are disposed in the path of the pushers 38 so that the bags may be pushed onto the conveyor 12 only through these openings. Springs 46 return the gates to their normal positions in alignment with the guides 37 when the pushers 38 are retracted.

Suitable adjusting means to determine the normal and ultimate positions of the pushers 38 includes headed screws 47 threaded into a carrying arm 48, which is a part of the slide 39 working in the main frame. It will be seen that by loosening the screws 47, each pusher may be adjusted until it has the proper set position, at which time the screws may be tightened to maintain this position.

When the bags have been transferred to the conveyor 12, they should be closely adjacent the following projections 14 carried by the belt. Inasmuch as the pliability of the bags is such that they do not always come in the same position, it is preferred to provide means to restrain the bags in their movement when the conveyor 12 moves forward. A light spring-pressed arm 49 (Fig. 4) is provided and bears lightly against the bag until the latter is forced past the arm by the projection 14.

When the bags have been pushed onto the conveyor 12, a predetermined movement, equal to twice the distance between projections 14, takes place. This movement brings both bags in position to be spread and sealed.

Inasmuch as the spreading mechanism comprises two identical sets, only one will be described. The perspective view Fig. 3, best discloses this mechanism.

Label feed and creasing mechanism

After the bag has been sealed, the conveyor 12 again advances and brings the sealed bags into position for the placing of labels over the closed mouth portions. Each label must be creased to an inverted V-form before it can be placed over a bag, so that it will maintain its position thereon until it can be sealed into place. Again the operating parts are duplicated to a great extent, since the bags are moved in pairs, and where this is true, only one of the mechanisms will be described.

The labels L to be used are set into the machine in vertically disposed racks 90. Inturned fingers 91 are formed from the front and side walls of the rack and serve to support the edge portions of the labels, leaving the entire central part of the under side of the bottom label exposed. The labels are pneumatically picked from the bottom of each stack one at a time by vacuum cups 92 carried in pairs by a tubular arm 93, the end of which is branched out to space the vacuum cups so that they engage a label at points adjacent each end and so tend to hold it in a horizontal plane. As shown in Fig. 8, the arm 93 is pivoted near its rear end to a table 94 in a suitable joint 95. The rear end of the tubular arm 93 is connected to a vacuum tank, subsequently described.

The table 94 is mounted for reciprocating movements in a bed 96 forming a part of the frame structure D of the machine.

Figures 22, 23:
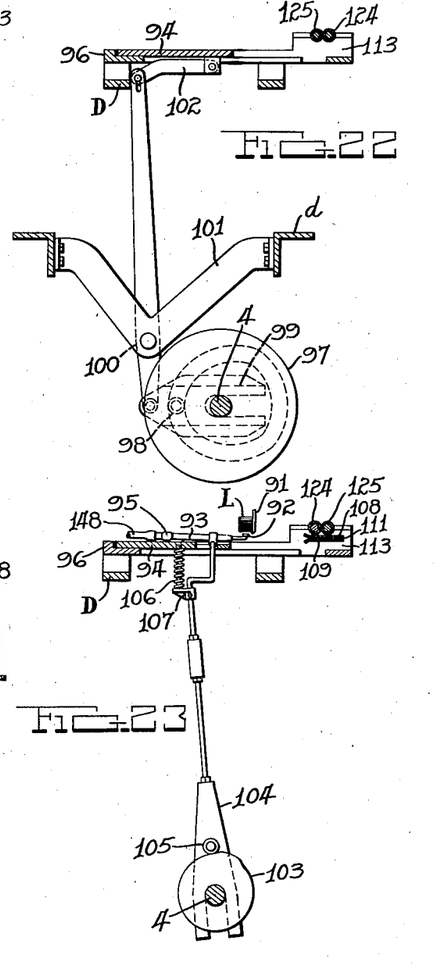
Fig. 22 is a detail view of the mechanism used to operate a part of the label feeding device.
Fig. 23 is a detail view of the mechanism used to pick the labels from a stack prior to the creasing and placing operations.

The mechanism used to reciprocate the table 94 is shown in Fig. 22 and includes a cam 97 carried by the main drive shaft 4. A follower 98 is carried by a bifurcated member 99 forked about the shaft to provide a bearing for itself. This member is connected at its rear end to a lever 100 pivoted intermediate its ends to a framepiece 101. At its upper end, the lever 100 has a pin and slot connection with an arm 102 carried by the table 94. It will thus be seen that as the cam 97 forces the follower 98 in a rearward direction, the table 94 will be caused to slide forward in the bed 96.

The picker-arm 93 has, in addition to its horizontal reciprocation imparted by the table 94, a vertical reciprocation derived from the mechanism shown in Fig. 23. As there shown, a cam 103 is carried by the main drive shaft 4 and moves a connecting rod 104 by means of a follower 105. A spring 106 carried between the table 94 and an arm 107 fixed to the rod 104 urges the latter downwardly. The rod is attached at its upper end to the arm 93. The cam 103 is so shaped that the vacuum cups 92 are caused to contact the lowermost of the labels in a stack and then move to detach it therefrom, after which the arm drops down as the table 94 carries it forward.

Figure 14:
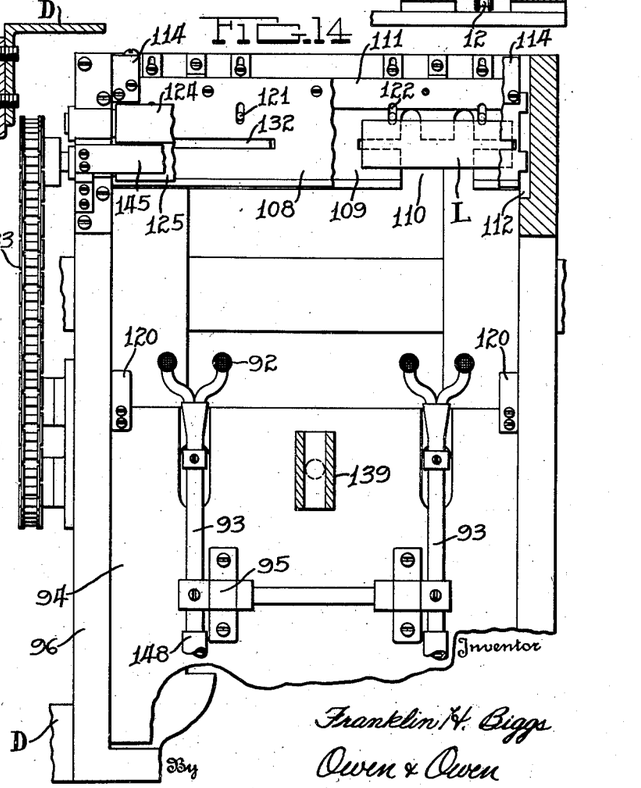
Fig. 14 is a fragmentary plan view, with parts broken away, of the label feeding mechanism.

Each label when carried forward by the vacuum cups 92 is deposited between spaced upper and lower plates 108 and 109, where the label is properly centered for the creasing operation. The lower plate is slotted as at 110 (Fig. 14) in the path of the vacuum picker so that the label may be carried well into the area between the plates 108 and 109.

Figure 10:
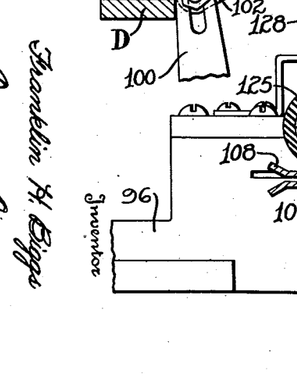
Fig. 10 is a detail view of the label squaring parts of the label feeding mechanism.
Figure 11:
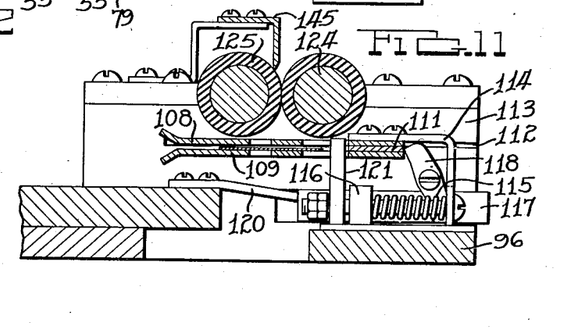
Fig. 11 is a view similar to Fig. 10, with the parts in another position.
Figure 12:
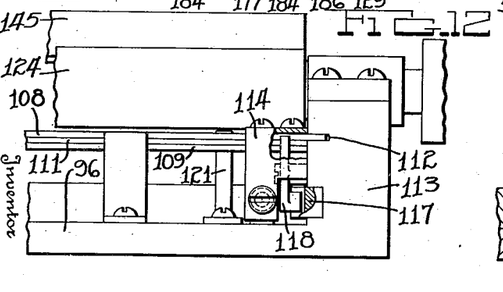
Fig. 12 is a front view of the parts shown in Fig. 11.

Inasmuch as the label is to extend on each side of the closed bag, it is necessary to crease it to enable it to straddle the bag and remain in position until sealed. Obviously, the crease must be exactly along a predetermined line, so that each bag when finished will conform to every other bag. For this reason, the labels are squared in position before being creased, by mechanism shown in Figs. 10, 11 and 12. The plates 108 and 109 are spaced by a third plate 111. The top plate 108 extends from each side of the plate 111 and enters a slot 112 formed in opposite upstanding side portions 113 of the bed 96. This plate assembly is connected to spaced brackets 114, which extend rearwardly and downwardly from each end of the upper plate 108. It will thus be seen that the plate assembly constitutes a horizontally disposed U-shaped member which is mounted for sliding movements in the bed 96. The plate assembly is normally biased to a position farthest from the label by compressed springs 115 held between the brackets 114 and projections 116 carried by the bed 96.

In order to reciprocate the plate assembly a lower contact block 117 is provided, and is associated with the upstanding side portions 113 of the bed 96 for reciprocating movements in channels formed in the sides 113. Each of the blocks 117 is grooved to receive the lower end of a pivoted lever 118 (Fig. 10), carried in a suitable pivotal connection intermediate its ends with the upstanding side portion 113 and bearing against the rear of the plate assembly at its upper end. It will thus be seen that if the contact block 117 is moved forward, or in the initial direction of movement of the vacuum pickers, the plate assembly will be moved rearward or in a direction opposite to the advancing label pickers. The pivoted levers 118, at each end of the assembly, cause this reversal of the motion. The springs 115 tend to urge the parts to the retracted position shown in Fig. 10.

As the table 94 advances toward the plate assembly 108, 109, and 111, a striker plate 120, carried by the table, contacts the striker block 117 and moves it forward as the table continues to advance. The associated pivoted lever 118 then moves the plate assembly toward the advancing vacuum label pickers which deposit a label between the upper and lower plates 108 and 109. The vacuum in the pickers is cut off so that the label may be deposited, and the pickers drop down and return to their original position to begin another cycle. As the plate assembly returns to its normal position, the label abuts spaced pins 121 carried by the bed 96 and projecting upward through slots 122 in the plate assembly adjacent each end of the label. Inasmuch as the label is halted in its movement derived from the returning plate assembly, its forward edge will always be squarely and accurately disposed against the stop pins 121.

Figure 21:
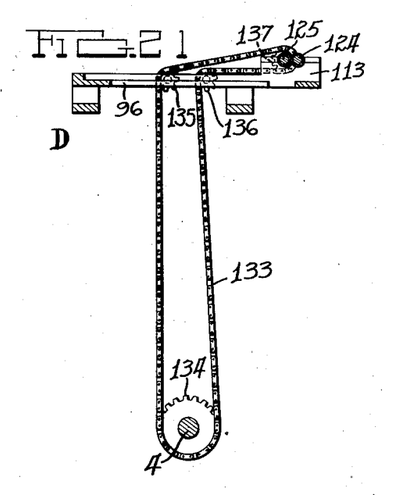
Fig. 21 is a detail view of the mechanism to operate the label creasing rollers.
Figure 24:
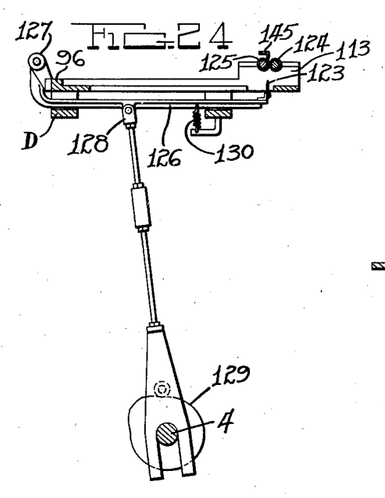
Fig. 24 is a detail view of the mechanism used to crease the labels.

With the labels, which are fed forward in pairs, in alignment, they are next acted on by creasing knives 123 (Fig. 24) and creasing rolls 124 and 125 (Fig. 21). Each knife 123 is carried at one end of a lever 126, pivoted to a bracket 127 carried at the rear end of the bed 96. Intermediate its ends the lever is connected to an actuating rod 128. A cam 129, carried by the main drive shaft 4, causes a timed vertical reciprocation of the rod 128 and of the creasing knife. A spring 130, disposed between the lever 126 and a suitable frame part, tends to return the knife to its lowered, inactive position.

The knife 123, on its upward movement, strikes the label exactly on a predetermined line and forces it through a lateral slot 132 in the top plate 108 and between the rotating creasing rolls 124 and 125. The rolls are rotated in opposite directions by a chain drive 133 actuated by a sprocket 134 carried by the main drive shaft 4. The chain is trained over idler wheels 135 and 136 carried by the bed 96 and engages a gear 137 at one end of one of the rolls, the other roll being turned by intermeshed gears at the opposite end, as clearly shown in Fig. 3.

Figure 25:
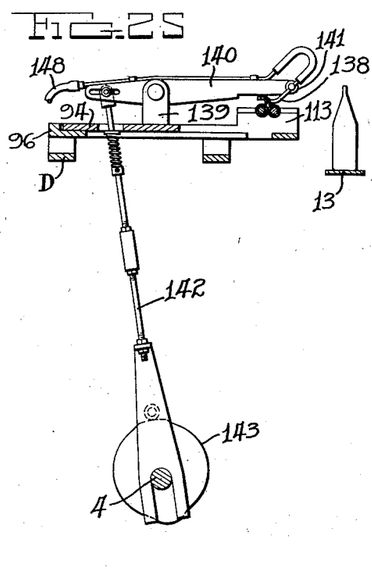
Fig. 25 is a detail view of the mechanism used to place the creased labels on a sealed bag.

The labels are creased in their movement between the rolls 124 and 125, and are then placed loosely on the tops of the sealed bags by vacuum carrier fingers 138, actuated by the mechanism shown in Fig. 25. As there shown, a support 139 is carried by the sliding table 94 and serves as a fulcrum for a lever 140, which, at its outer end, supports the vacuum fingers 138 in spaced relation by means of a boss 141. At its rear end, the lever 140 is connected to an actuating rod 142, which is moved by a cam 143 carried by the main drive shaft 4. The motion imparted to each vacuum finger is such that it moves forward with the plate 94, after having picked up a label as it emerges from between the creasing rolls, and thence moves upwardly to a point overlying the neck of the sealed bag. This ultimate position is shown in dotted lines in Fig. 8. At this point, the vacuum is cut off and the label drops down across the neck of the bag.

A backing plate 145 extends the full length of the creasing rolls closely adjacent to the rear creasing roll 126, so as to guide the creased labels into the path of the vacuum fingers. The bags are centered in this position, with respect to the point of release of the labels from the vacuum fingers 138, by rails 146 (Figs. 3 and 8) disposed forwardly and rearwardly of the upper portions of the bags and projecting from brackets 147 secured to or forming parts of the adjacent ends of the sealing jaws 70 and 71. As the jaws 70 and 71 move together to effect a sealing of a pair of bags at the sealing station, the rails 146 will move toward each other and effect a centering of the sealed ends of a pair of bags with respect to the label dropping fingers at the label positioning station.

Figure 2:
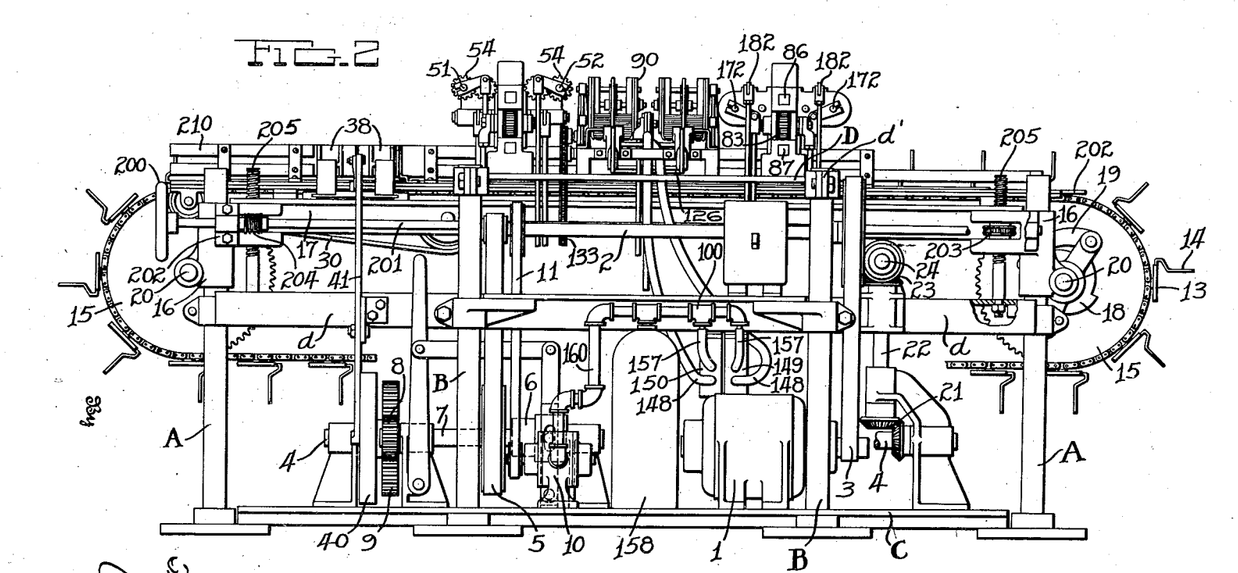
Fig. 2 is a rear elevation of the machine, with parts broken away.
Figure 15:
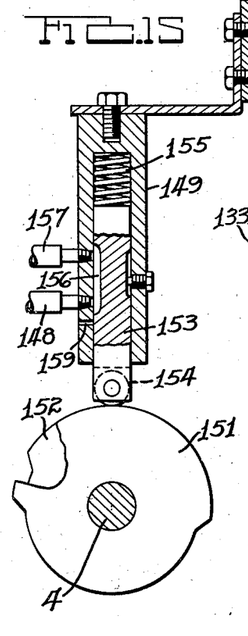
Fig. 15 is a detail view of a pneumatic control for the label feeding means.
Figure 16:
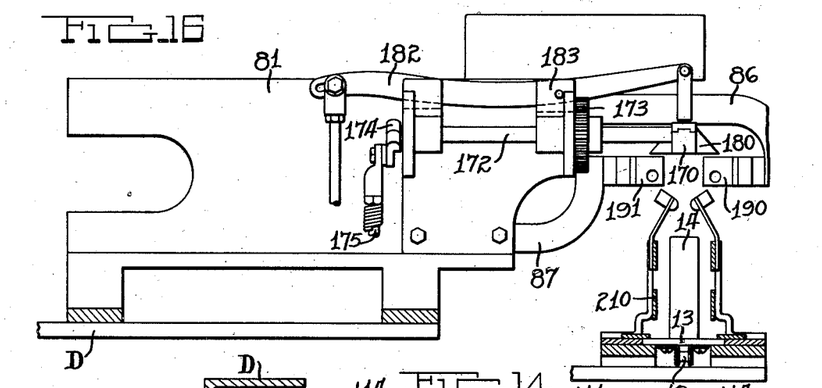
Fig. 16 is a fragmentary side view of the label centering and sealing device.
Figure 17:
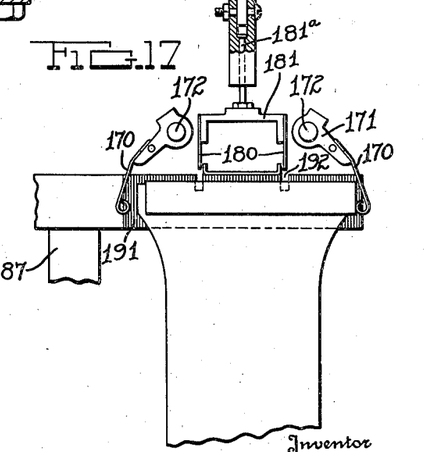
Fig. 17 is a fragmentary front view of the laterally movable label straightening means.

Any suitable means may be used to control the vacuum in the label pickers 92 and the vacuum fingers 138. In the machine disclosed, these parts are connected by flexible conduits 148 to valve mechanisms comprising cylinders 149 and 150 (Fig. 2) having suitably cut pistons operated therein by cams 151 and 152 (Fig. 15) carried by the main drive shaft 4. The valve mechanism for the label pickers is identical to that controlling the fingers 138, except for the shape of the cam. In Fig. 15 is shown a piston 153 having a cam follower 154. A spring 155 urges the piston carried follower 154 against the operating cam 151. The conduits 148 from the pickers join and enter the cylinder intermediate its ends, and the piston is cut away in a groove 156 to place this conduit in communication alternately with a conduit 157 leading to a vacuum tank 158 and an air vent 159 in the cylinder wall. It will be seen that as the piston reciprocates, air is thus sucked from the picker conduits 148 in one position, and the vacuum relieved in another position. Obviously, the cycle is controlled by the configuration of the cam.

The vacuum tank 158 is connected to the constantly driven pump 10 by suitable piping 160.

In the case of the label picking cups 92, the vacuum is "on" from the time the cups approach the stack of labels until the labels are deposited between the upper and lower plates 108 and 109. In the case of the carrier fingers 138, the vacuum is "on" from the time the fingers approach the creasing rolls until the labels are released to drop on the bags preparatory to being sealed thereon.

*Label centering and sealing means*

Figure 18:
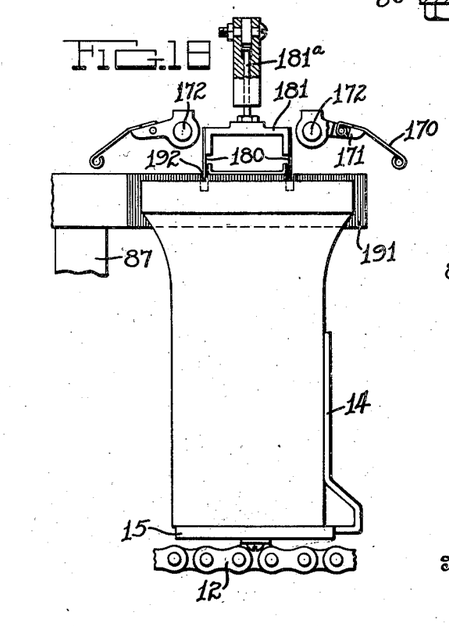
Fig. 18 is a view of the parts shown in Fig. 17 in another position.

Since the labels are dropped on the bags only in their approximate final positions, it is necessary to center them with relation to the bags before sealing them in place. The conveyor 12 advances and brings the pair of bags, with the labels thereon, into the final operating position. The labels are centered by the mechanism shown in Figs. 16, 17, 18, 26, and 27. If the label is out of alignment, so that its protrudes from either end of the closed top, this fault is first corrected by the action of opposed fingers 170 pivotally carried by and extending from lever arms 171 on the outer ends of parallel shafts 172 journaled in suitable bearing brackets on the main frame D. As shown in Fig. 18, each finger 170 is pivoted in a slot in the lever arm 171, so that it is free to turn in an outward direction. Thus, the only force which these fingers can exert when moving in a direction toward each other, is due to their own weight. This provision is made because of the fact that the labels are easily moved, and because care must be exercised not to disturb the neck of the bag before the label is sealed in place, after which it serves to reinforce the mouth and prevent its distortion.

Figure 3:
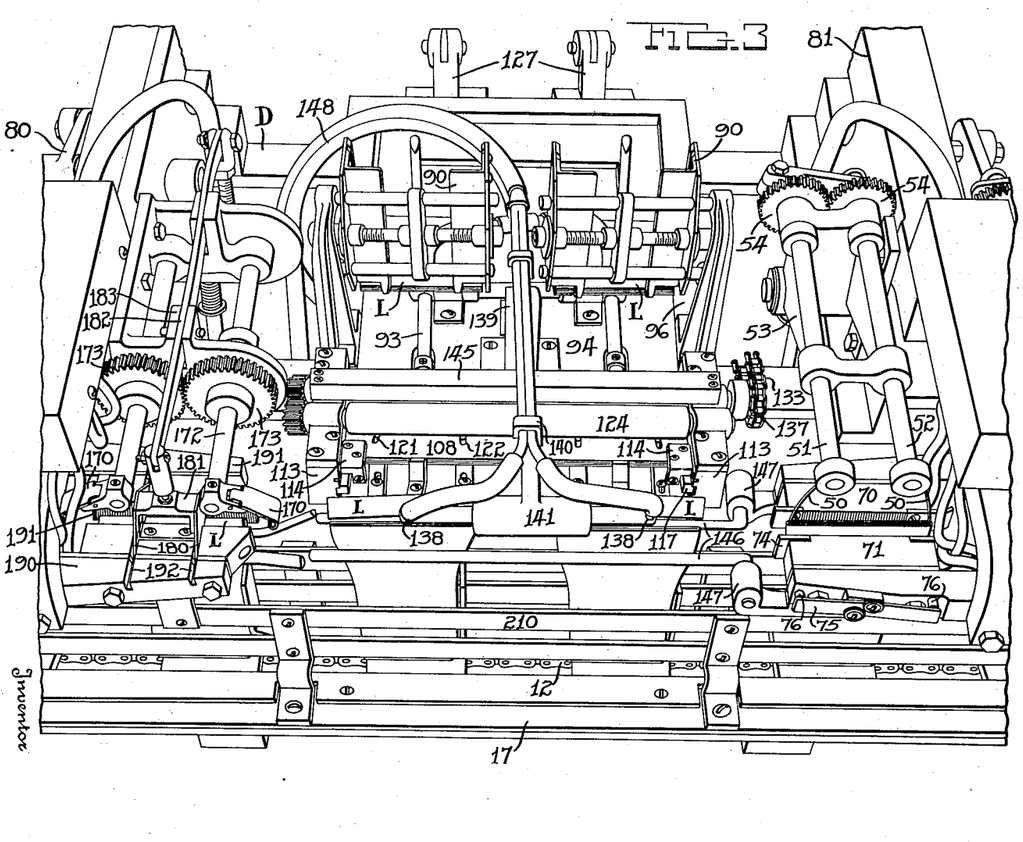
Fig. 3 is a fragmentary perspective view of the top of the machine showing the operating parts.

The fingers 170 are moved together by partially rotating the parallel shafts 172 in opposite directions. As shown in Fig. 3, each of these shafts has a gear 173 fixed thereto, which gears are intermeshed. Thus, if one shaft is turned, the gearing will cause the other shaft to turn in the opposite direction. The mechanism used to rotate the shafts is shown in Fig. 26 and includes an arm 174 extending outwardly from one of the shafts 172. At its outer end the arm is connected to a push-rod 175, which carries a cam follower 176 adjacent its lower end in contact with a suitable cam 177 fixed on the main drive shaft 4. The rod 175 is slotted, as at 178, to receive the shaft so as to prevent side play of the cam follower.

Figure 27:
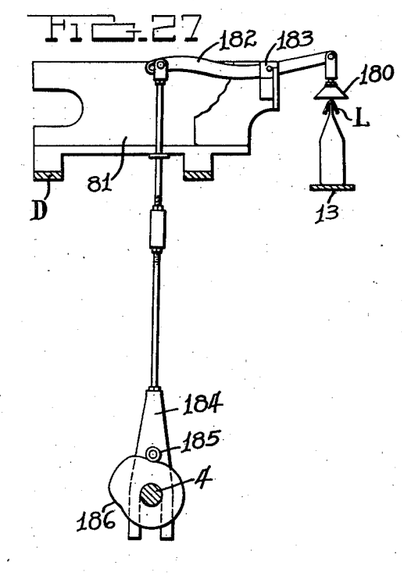
Fig. 27 is a detail view of the mechanism used to further position the label on the sealed bag.

A further operation is provided which presses the labels down on the bags before sealing. In this way, the top of the sealed bag is forced into the apex of the V-shaped label. The mechanism used for this purpose includes spaced contacting parts 180 carried in a yoke 181, which in turn is carried by a lost-motion connection 181ᵃ at the forward end of a lever arm 182 pivoted in a frame part 183 between the parallel shafts 172. As shown in Fig. 27, the rear end of the lever 182 is connected to an actuating rod 184, carrying a cam follower 185 at its lower end which rides on a cam 186 carried by the main drive shaft 4. Thus, as the rod 184 is moved upward by the cam 186, the front end of the lever 182 moves down, bringing the contacting parts 180 against the label and forcing it into proper vertical position relative to the top of the bag.

Figure 28:
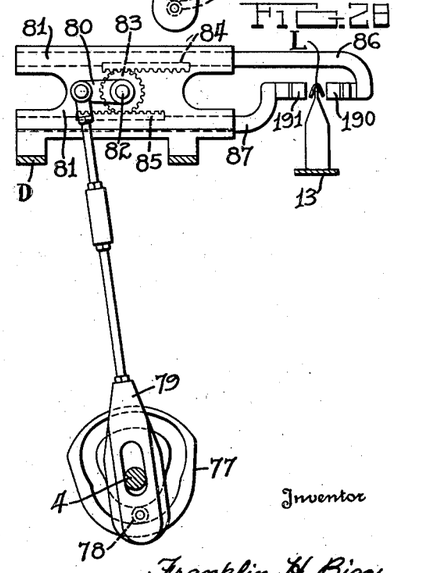
Fig. 28 is a detail view of the mechanism used to seal the bags initially.

When the labels are in proper position, both vertically and horizontally, they are sealed in place by the application of heat and pressure through jaws 190 and 191. Inasmuch as "Cellophane" becomes plastic under heat, adhesion of the contacting surfaces of the paper labels with the bags is effectually and simply accomplished in this manner. The mechanism used to actuate the jaws 190 and 191 is shown in Fig. 28 and includes a cam 77 carried by the main drive shaft 4. A follower 78 is carried by a rod 79, which latter is slotted to straddle and be guided in its reciprocating movements by the main drive shaft 4. The upper end of the rod is connected to an arm 80 having one end journaled in a housing 81 on a stub shaft 82. A pinion 83 is fixed on the shaft so as to turn whenever the arm 80 is rotated by a movement of the rod 79. Meshing with the pinion 83 are racks 84 and 85 formed on upper and lower arms 86 and 87 at the outer ends of which are carried the heated jaw members. The arms 86 and 87 are guided for reciprocating movements in the housing 81. It will thus be seen that as the pinion 83 is rotated, the arms 86 and 87 are moved in opposite directions in a horizontal plane and thus the jaws are moved together to seal the label with the thermoplastic substance of which the bag mouth is constructed.

The jaws 190 and 191 are electrically heated by any suitable heating elements 72, and the temperature therein is kept constant by means of a thermostat situated within one of the jaws. The jaws 190 and 191 are grooved from front to back as at 192 to permit the label contacting parts 180 to enter the space between the jaws to determine the vertical position of the label relative to the top of the bag. As the jaws retract, having sealed the labels in place on the bags, the conveyor 12 is again moved, bringing the finished bags in position to be taken from the machine.

*General provisions*

In order to make the machine adjustable to adapt it to act on bags of different lengths, the cross member 17, which is sleeved on the upper ends of the front uprights A, A, and carries the bag-supporting and feeding parts, is vertically adjustable. Such vertical adjustment is accomplished by the rotation of hand members 203 (Fig. 2) on threaded rods 205, which fixedly rise from the frame D. The members 203 are disposed in brackets projecting inwardly from the respective sleeve 16 and each constitutes a worm-wheel with which a respective worm 204 on a control shaft 201 engages. The shaft 201 is mounted in bearings carried by the sleeves 16 and has a hand-control wheel 200 at one end.

A rail 210 is mounted on the cross piece 17 lengthwise thereof and provides a guide for the bags at the forward sides thereof as they are moved from station to station by the conveyor 12.

From the foregoing description, it is apparent that the bags, as they are fed through the machine, have like operations simultaneously applied thereto in pairs. Following one pair of bags through the machine, the bags are first transferred from the feed belt 30 forwardly onto the intermittently moved conveyor 12. The bags are then carried by the conveyor to the initial bag sealing position where the sets of spreading fingers 50—50 enter the open end of each bag and are then moved away from each other to effect a stretching of the bag end to place its side walls in flat, parallel, closely disposed, relation. After such spreading action, the pressing and heating jaws 70 and 71 close upon the bag end and effect a sealing thereof, and, during such sealing operation, the spreading fingers are withdrawn. The sealing jaws then open and the conveyor moves the bags to the next station where the placing of labels on their closed ends preparatory to being subsequently sealed is effected. At this station, the labels are first picked from stacks carried in racks 90 and are moved forward to a squaring plate assembly 108 and 109. Creasing knives 123 then force the labels from the squaring means to between creasing rolls 124 and 125. As the labels emerge from the creasing rolls, they are picked up by pneumatic fingers 138 and are carried forwardly and upwardly by combined rocking movements of the lever 140 and sliding movement of the table 94 to a point immediately overlying the closed ends of the bags. The vacuum of the fingers is then cut off and the labels allowed to drop on the vertically registering closed ends of the bags.

The labels having been placed on the bag ends, the bags are again moved to the final operating position where the labels are first centered on the bags by the gravity action of the respective sets of rocking fingers 170, and, at approximately the same time, the members 180 are actuated to press the labels closely down on the bag ends. This being accomplished, the jaws 190 and 191 of each set are brought together upon the opposed sides of the respective labels to effect a close pressing and heat-sealing of the labels to the bag. After this final operation, the bags are again moved by the conveyor to discharging position.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a machine of the class described, a rack carried by the machine to hold a stack of labels, means operable to remove a label from said stack and deliver it to a predetermined position, means to take the label from said position and crease it along a predetermined line, and pneumatic means to deliver the creased label to the neck of a bag.

2. In a machine of the class described, a label carrying rack supported by the machine, means pneumatically operable to remove a label from said rack and deliver it to a predetermined position to square the label in such position, creasing rolls, means to move the label from said squaring position to between the creasing rolls, and means to deliver the creased label to the mouth of a bag.

3. In a machine of the class described, a label carrying rack, means to remove a label from said rack, means to crease the removed label on a predetermined line, said means including oppositely rotating rolls, a reciprocating machine part, a lever carried by said part, a pneumatic finger carried by said lever at one end, and means to operate said lever to bring said finger adjacent said rolls to engage a creased label as it emerges from the rolls and then to impart predetermined movement to said finger to deliver the label to the mouth of a bag.

4. In a machine of the class described, means to center a label on the closed end of a bag, including parallel rock shafts, fingers disposed at the ends of said shafts and adapted to be moved thereby in one direction and movable in the other direction by gravity, means to bring a bag and label centrally between said fingers, and means to rock said shafts whereby said fingers are permitted to move by gravity into contact with the label to act thereon to center it with relation to the bag.

5. In a machine of the class described, means to center a label on the closed end of a bag, including a pair of opposed fingers adapted to be positively moved in one direction and movable in the other direction by gravity, means to bring a bag and label centrally between said fingers, and means to move said fingers to a point whereby gravity moves said fingers into contact with the label to act thereon to center it with relation to the bag, and to positively retract said fingers.

6. In a machine of the class described, means to center a label with relation to a bag, a lever having an end overlying the bag, means to rock said lever in a vertical plane, fingers carried by said end of the lever and adapted to contact the centered label during a downward movement of the lever to move the label to a predetermined and centralized position on the bag.

7. In a machine of the class described, means to center a label with relation to a bag, vertically reciprocable means to move the centered label into a predetermined vertical position with relation to the bag, opposed heated jaws disposed on each side of the bag, and means to move said jaws whereby the label is sealed to the bag by the application of heat and pressure from said jaws.

8. In a machine of the class described, means to position a label on the closed end of a bag including parallel rock shafts, fingers disposed at the ends of said shafts and adapted to be moved thereby in one direction and movable in the other direction by gravity, vertically reciprocable means to move a label into a predetermined vertical position, and separate means actuated in predetermined timed relation to move said vertically reciprocable means against the label, and to rock said shafts whereby said fingers are permitted to move by gravity into contact with the label to center it with relation to the bag.

9. In a machine of the class described, means to position a label on the closed end of a bag including parallel rock shafts, fingers disposed at the ends of said shafts and adapted to be moved thereby in one direction and movable in the other direction by gravity, vertically reciprocable means to move a label into a predetermined vertical position, separate means actuated in predetermined timed relation to move said vertically reciprocable means against the label and to rock said shafts whereby said fingers are permitted to move by gravity into contact with the label to center it with relation to the bag, opposed heated jaws disposed on each side of the bag, and means to move said jaws whereby the label is sealed to the bag by the application of heat and pressure.

10. In a machine of the class described, means to support a sealed bag having a mouth portion of thermoplastic material, means to place a reinforcing label loosely on the sealed mouth of the bag, means to center said label on the bag, and means to seal said label in place on the bag by the application of heat and pressure.

11. In a machine of the class described, means to move a sealed bag to a predetermined position, pneumatic means acting at said position to place a previously creased label over the neck of a bag, and means to center a bag in position to receive the label.

12. In a machine of the class described, means to support a sealed bag, means to hold a stack of labels, means to remove a label from the stack, crease the label along a predetermined line and deliver it to the sealed end of the bag, and means to seal said creased label to the bag.

13. In a machine of the class described, means to support a sealed bag, means to hold a stack of labels, means to remove a label from the stack, crease the label and deliver it to the sealed end of the bag, means to center the label on the bag, and means to seal said label in position on the bag.

14. In a machine of the class described, means to support a sealed bag, means to hold a stack of labels, means to remove a label from the stack and crease it along a predetermined line, pneumatic means to deliver the creased label to the sealed end of the bag, and means to seal said label to the bag.

15. In a machine of the class described, means to support a sealed bag, means to hold a stack of labels, means to remove a label from the stack and crease it along a predetermined line, pneumatic means to deliver said creased label to the sealed end of the bag, means to center the label on the bag, and means to seal said label in position on the bag.

FRANKLIN H. BIGGS.